US010259260B2

(12) United States Patent
Kim et al.

(10) Patent No.: US 10,259,260 B2
(45) Date of Patent: Apr. 16, 2019

(54) TRANSFORMABLE WHEEL

(71) Applicant: Soongsil University Research Consortium Techno-Park, Seoul (KR)

(72) Inventors: Jin Oh Kim, Seoul (KR); Jeong Gil Hwang, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 322 days.

(21) Appl. No.: 15/132,336

(22) Filed: Apr. 19, 2016

(65) Prior Publication Data

US 2016/0303901 A1    Oct. 20, 2016

(30) Foreign Application Priority Data

Apr. 20, 2015   (KR) .......................... 10-2015-0055142

(51) Int. Cl.
| | | |
|---|---|---|
| *B60B 15/18* | (2006.01) | |
| *B60B 19/02* | (2006.01) | |
| *B60B 15/00* | (2006.01) | |
| *B62D 57/024* | (2006.01) | |

(52) U.S. Cl.
CPC .............. *B60B 15/18* (2013.01); *B60B 15/00* (2013.01); *B60B 19/02* (2013.01); *B62D 57/024* (2013.01); *B60B 2900/351* (2013.01); *B60B 2900/721* (2013.01)

(58) Field of Classification Search
CPC ......... B60B 15/18; B60B 15/22; B60B 19/02; B62D 57/024; B62D 57/028
See application file for complete search history.

(56) References Cited

U.S. PATENT DOCUMENTS 2,437,407 A  *  3/1948  Singer .................... B60B 15/18
                                                                305/19

FOREIGN PATENT DOCUMENTS

| FR | 2829968 | * | 9/2001 | ............. B60B 15/18 |
|---|---|---|---|---|
| JP | 2013-052779 A | | 3/2013 | |
| KR | 20-0307551 Y1 | | 3/2003 | |
| KR | 10-0546952 B1 | | 1/2006 | |
| KR | 10-2009-0103357 A | | 10/2009 | |
| WO | WO2014/003512 A1 | * | 1/2014 | ............. B60B 15/18 |

\* cited by examiner

*Primary Examiner* — Jason R Bellinger
(74) *Attorney, Agent, or Firm* — Pearne & Gordon LLP (57) ABSTRACT

A transformable wheel includes a wheel frame including a plurality of contact portions and a plurality of recessed portions. A plurality of transforming members is provided wherein one side of each transforming member is rotatably coupled to a corresponding one of the recessed portions and an outer surface of each transforming member forming a portion of the wheel frame. A rotating member is provided at one side surface of the wheel frame, and includes a plurality of transformation locking members arranged radially from the central axis of the wheel frame to correspond to the plurality of transforming members, respectively. A driving member is configured to rotate the rotating members by a preset angle about the central axis of the wheel frame.

9 Claims, 9 Drawing Sheets

TRANSFORMABLE WHEEL

CROSS-REFERENCE TO RELATED APPLICATION

This application claims the benefit of Korean Patent Application No. 10-2015-0055142 filed on Apr. 20, 2015, the entire disclosure of which is incorporated herein by reference.

BACKGROUND

The various embodiments described herein pertain generally to a transformable wheel.

The invention of wheels, which allow heavy objects to be moved easily, has led to the development of early civilizations. In the modern society as well, wheels are widely utilized as an indispensable component in everyday life. For example, wheels can be found in various applications, such as a car, a wheelchair, a baby stroller, a cart, and so forth, to provide convenience for living.

A generally circular wheel is very efficient when travelling on an even ground. When passing an obstacle, such as stairs, however, the circular wheel is not efficient. In particular, when using a wheelchair, a stroller or a cart, it takes a lot of force and effort for a user to pass an obstacle, such as stairs. Many attempts have been made to provide user convenience in such cases.

In this regard, Korean Patent Laid-open Publication No. 10-0546952 (entitled "Electric Wheelchair") describes a wheelchair designed to have improved stair-climbing ability. In this wheelchair, the heights of the front wheels and the rear wheels can be adjusted independently. In addition, the wheelchair includes a lever that is driven by a motor to aid in climbing stairs. This configuration is characterized in that the heights and movements of the front wheels and the rear wheels are controlled by using two motors.

This prior art wheel equipment is, however, of a high price. Moreover, a great force is temporarily required when the wheelchair climbs the stairs by the lever, which tends to create safety issues.

Further, Korean Utility Laid-open publication No. 20-0307551 (entitled "Multi Shaft Wheel") discloses a structure that combines typical wheels. With this structure of combined wheels, a greater force can be obtained as the wheels are rotated in a radius of rotation which is larger than a typical radius of rotation. This structure can be manufactured at a low cost and is deemed to provide improved stair-climbing ability. When this structure travels on an even ground, however, the combined two wheels come into contact with the ground, resulting in the generation of a great amount of friction between the wheels and the ground. Thus, as compared to a case of using a single wheel, this structure may cause a user to feel more fatigued.

Thus, it is desirable to have a wheel structure capable of passing an obstacle, such as stairs or a slope with a small force without suffering deterioration in travel ability on an even ground.

BRIEF SUMMARY

In view of the foregoing, example embodiments provide a transformable wheel capable of overcoming an obstacle, such as stairs, a structure, a natural topography, or the like.

However, the problems sought to be solved by the present disclosure are not limited to the above description.

In accordance with an example embodiment, a transformable wheel includes a wheel frame including a plurality of contact portions and a plurality of recessed portions, the contact portions being provided at an outer circumference of the wheel frame and each being formed at a preset angle with respect to a central axis of the wheel frame, and the recessed portions being provided between the plurality of contact portions and each being depressed from the outer circumference of the wheel frame in an inward direction thereof; a plurality of transforming members, one side of each transforming member being rotatably coupled to a corresponding one of the recessed portions and an outer surface of each transforming member forming a portion of the wheel frame; a rotating member provided at one side surface of the wheel frame, and including a plurality of transformation locking members arranged radially from the central axis of the wheel frame to correspond to the plurality of transforming members, respectively; and a driving member configured to rotate the rotating members by a preset angle about the central axis of the wheel frame, wherein the transformation locking members are moved from the inner surfaces of the transforming members as the rotating member is rotated by the driving member, and a plurality of grooves is formed along the outer circumference of the wheel frame as the transforming members are rotated in the inward direction of the wheel frame.

In accordance with another example embodiment, a transformable wheel includes a wheel frame including a plurality of contact portions and a plurality of recessed portions, the contact portions being provided at an outer circumference of the wheel frame and each being formed at a preset angle with respect to a central axis of the wheel frame, and the recessed portions being provided between the plurality of contact portions and each being depressed from the outer circumference of the wheel frame in an inward direction thereof; a plurality of transforming members, one side of each transforming member being rotatably coupled to a corresponding one of the recessed portions and an outer surface of each transforming member serving as the wheel frame; a rotating member provided at one side surface of the wheel frame, and including a saw tooth portion extending along an outer circumference of the rotating member and also including a plurality of transformation locking members arranged radially from the central axis of the wheel frame to correspond to the plurality of transforming members, respectively; and a driving member including a plurality of pressing members provided along outer peripheral surfaces of the contact portions to be movable in the inward direction, wherein the transformation locking members are moved from the inner surfaces of the transforming members as the rotating member is rotated by the driving member, and a plurality of grooves is formed along the outer circumference of the wheel frame as the transforming members are rotated in the inward direction of the wheel frame.

According to the example embodiments, the transformable wheel has a circular shape on an even ground, whereas the transformable wheel is turned into a form having grooves when passing over an obstacle. Therefore, by using this transformable wheel, it is possible to pass over the obstacle while maintaining operational efficiency on the even ground.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, example embodiments will be described in detail with reference to the accompanying drawings so that the inventive concepts may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the document.

Throughout the document, the terms "connected to" or "coupled to" are used to designate a connection or coupling of one element to another element and include both a case where an element is "directly connected or coupled to" another element and a case where an element is "electronically connected or coupled to" another element via still another element.

Throughout the document, the term "on" is used to designate that a position of one element with respect to another element includes both a case that the one element is adjacent to the another element and a case that any other element exists between these two elements Throughout the document, the term "comprises or includes" and/or "comprising or including" are used to mean that one or more other components, steps, operations, and/or the existence or addition of elements are not excluded in addition to the described components, steps, operations and/or elements.

Figure 1:
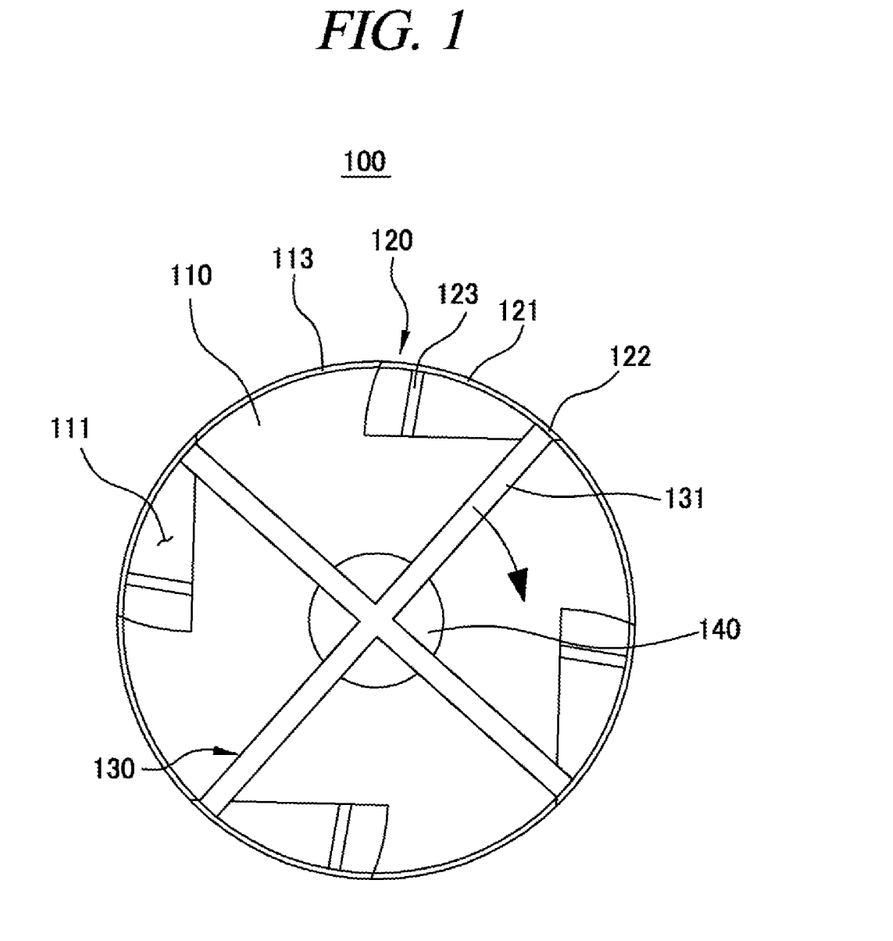
FIG. 1 is a schematic diagram illustrating a transformable wheel in accordance with a first example embodiment.
Figure 2:
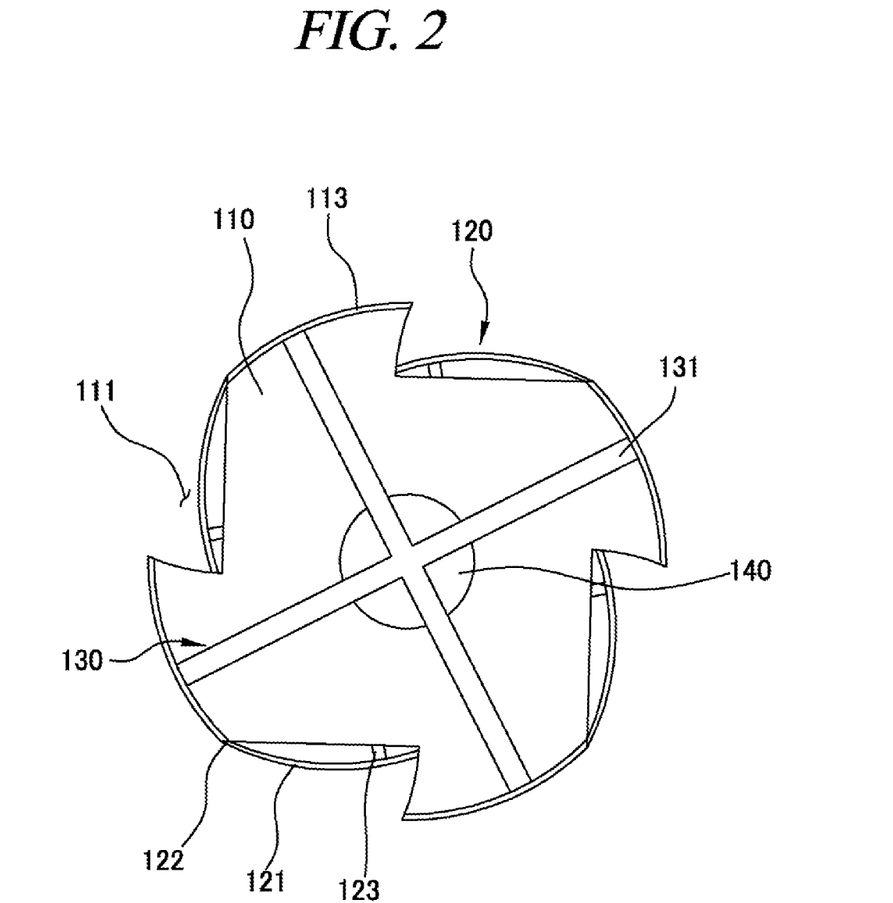
FIG. 2 is a schematic diagram illustrating an operation mechanism of the transformable wheel according to the first example embodiment.
Figure 3:
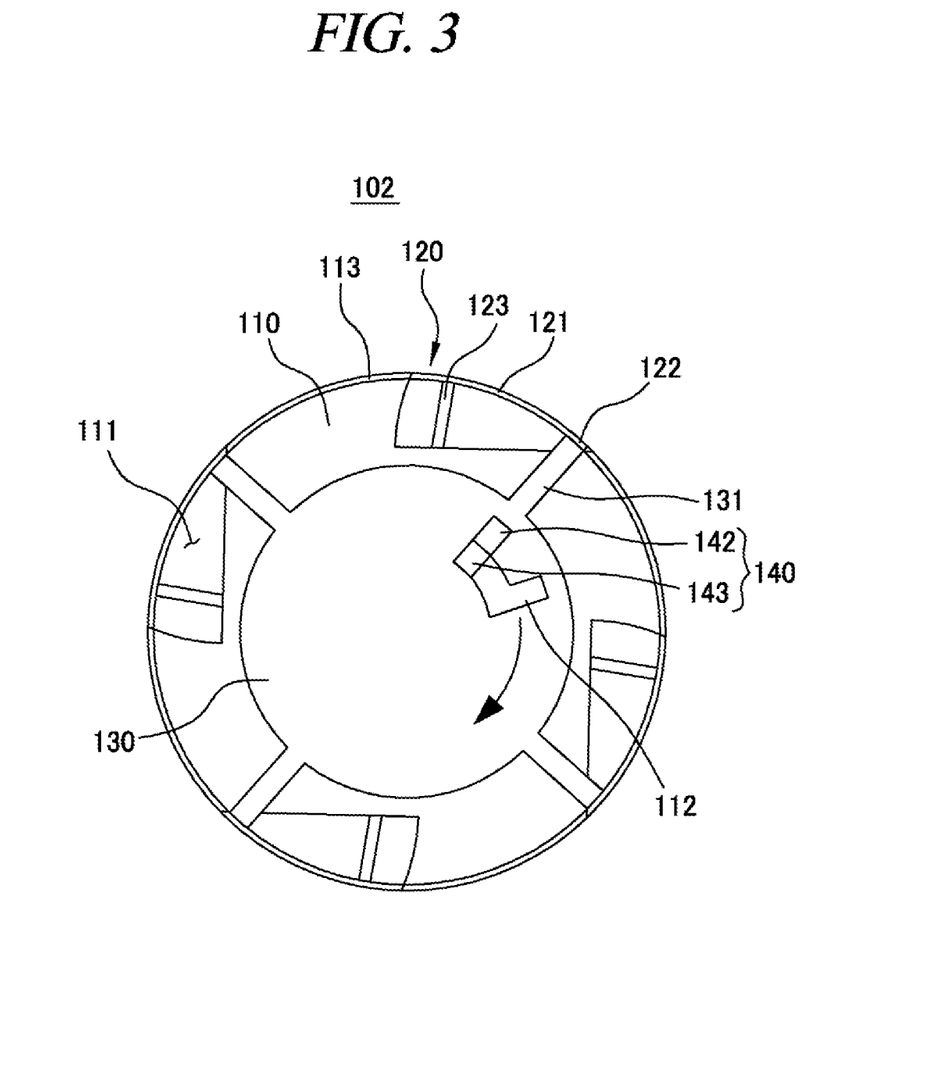
FIG. 3 is a schematic diagram illustrating a transformable wheel according to a second example embodiment.
Figure 4:
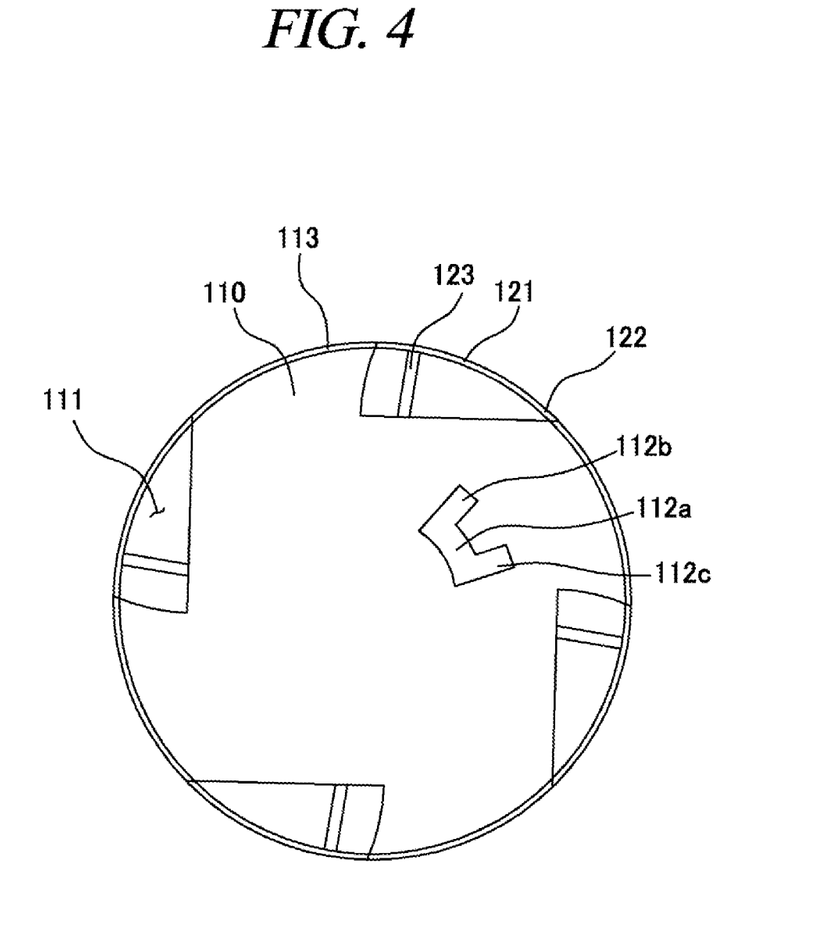
FIG. 4 is a schematic diagram illustrating a wheel frame according to the second example embodiment.
Figure 5:
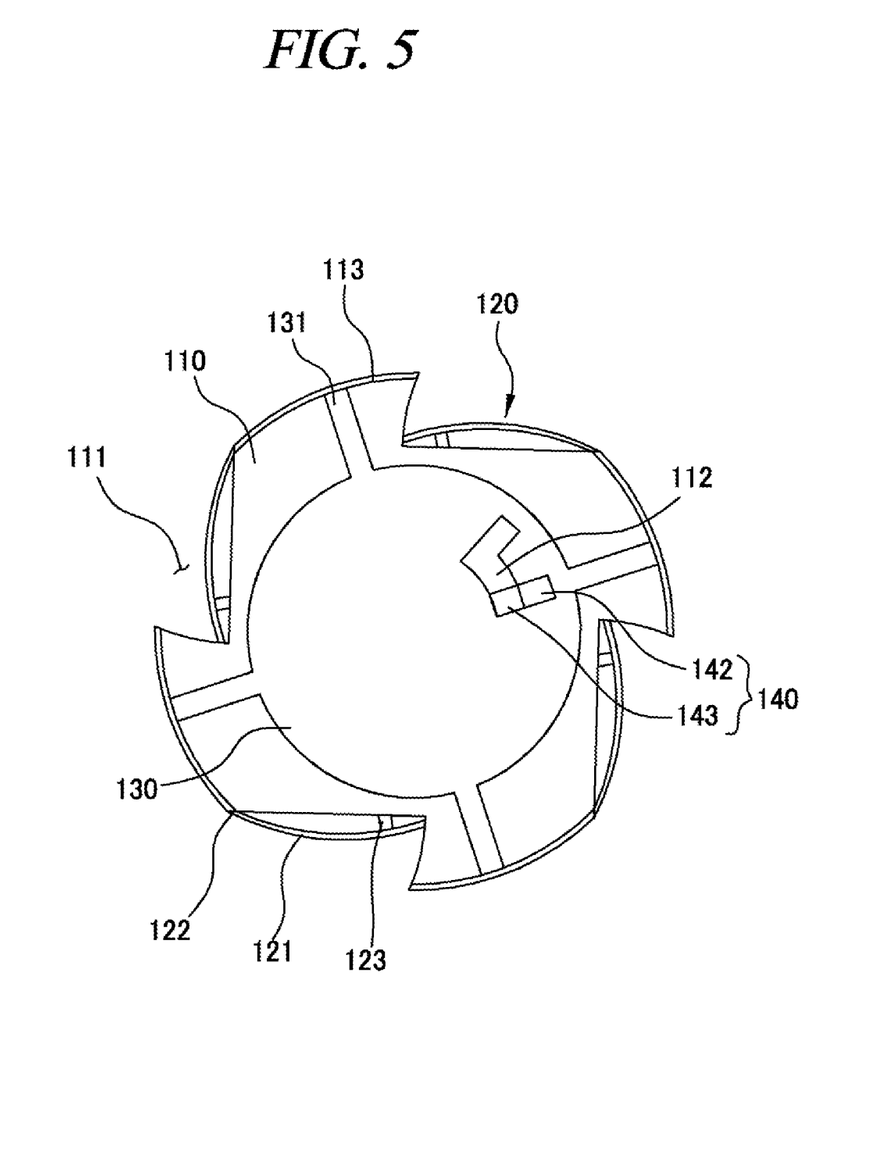
FIG. 5 is a schematic diagram illustrating an operation mechanism of the transformable wheel according to the second example embodiment.
Figure 6:
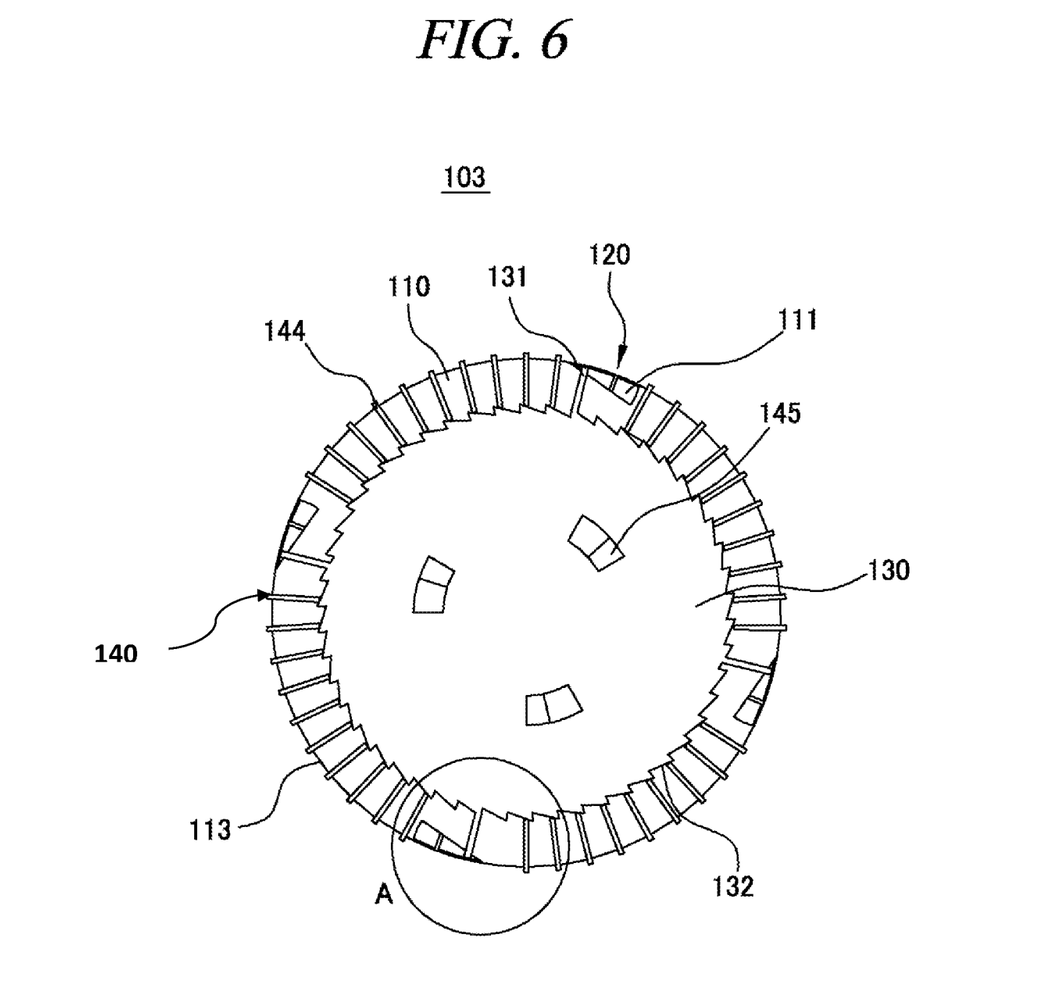
FIG. 6 is a schematic diagram illustrating a transformable wheel according to a third example embodiment.
Figure 7:
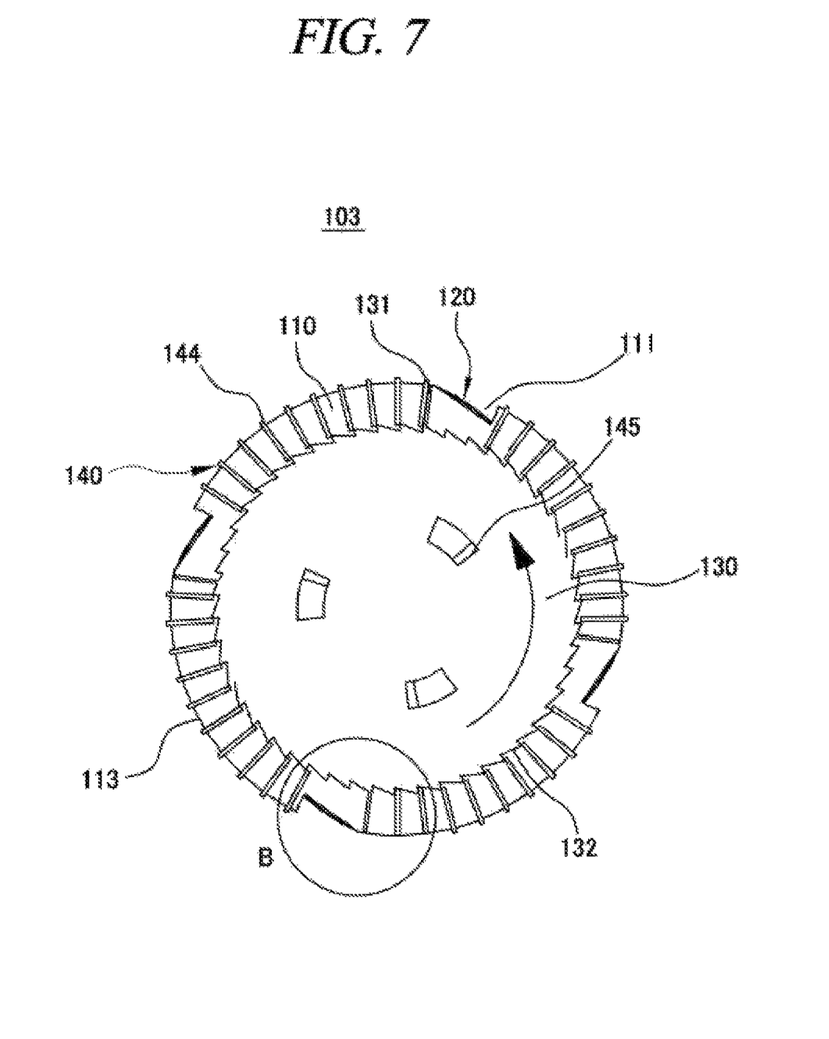
FIG. 7 is a schematic diagram illustrating an operation mechanism of the transformable wheel according to the third example embodiment.
Figure 8A:
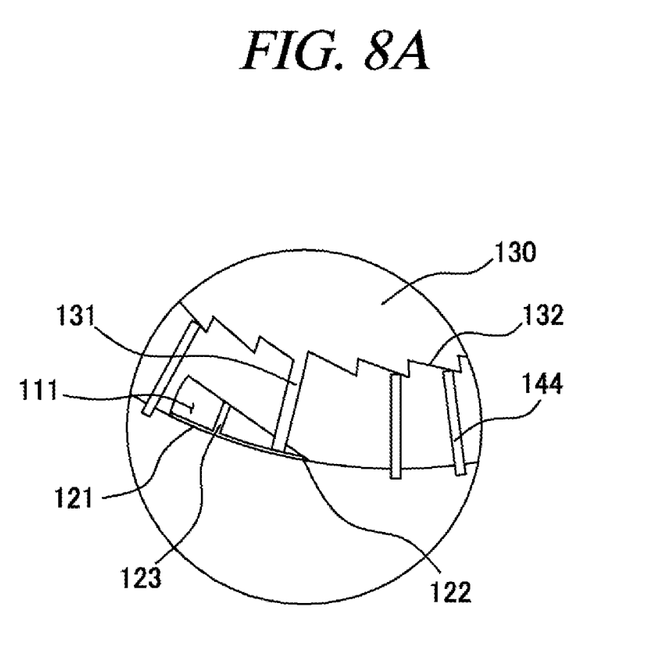
FIG. 8A is an enlarged view of a portion A of FIG. 6.
Figure 8B:
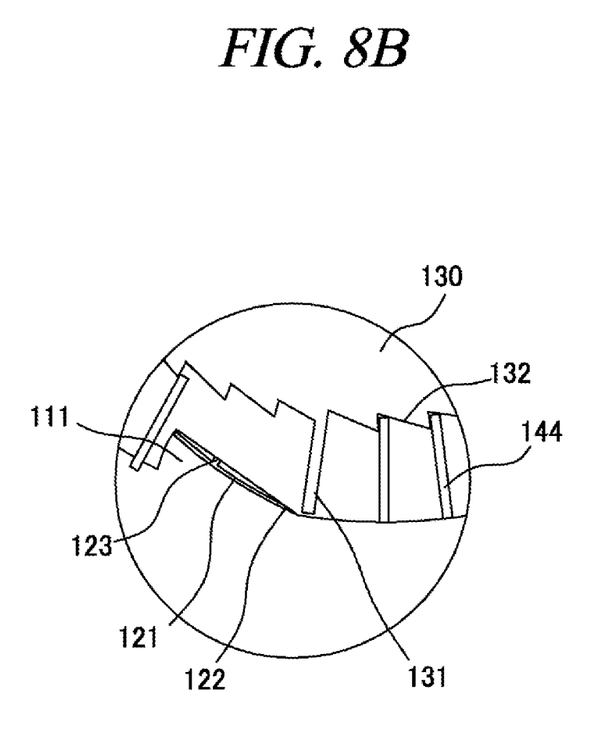
FIG. 8B is an enlarged view of a portion B of FIG. 7.

FIG. 1 is a schematic diagram illustrating a transformable wheel in accordance with a first example embodiment, and FIG. 2 is a schematic diagram for describing an operation mechanism of the transformable wheel according to the first example embodiment. FIG. 3 is a schematic diagram illustrating a transformable wheel according to a second example embodiment, and FIG. 4 is a schematic diagram illustrating a wheel frame according to the second example embodiment. FIG. 5 is a schematic diagram for describing an operation mechanism of the transformable wheel according to the second example embodiment. FIG. 6 is a schematic diagram illustrating a transformable wheel according to a third example embodiment, and FIG. 7 is a schematic diagram for describing an operation mechanism of the transformable wheel according to the third example embodiment. FIG. 8A is an enlarged view of a portion A of FIG. 6 and FIG. 8B is an enlarged view of a portion B of FIG. 7.

Referring to FIG. 1 and FIG. 2, a transformable wheel 100 according to a first example embodiment will be described.

The transformable wheel 100, in general, includes a wheel frame 110, transforming members 120, a rotating member 130 and a driving member 140.

The wheel frame 110 has a circular wheel shape and is configured to be revolvable on a central axis thereof.

Further, the wheel frame 110 has a plurality of contact portions 113 which are located at an outer circumference thereof; and recessed portions 111 which are provided between the contact portions 113. Each of the contact portions 113 is formed at a preset angle with respect to the central axis of the wheel frame 110, and each of the recessed portions 111 is depressed from the outer circumference of the wheel frame 110 in the inward direction.

One side of each transforming member 120 is rotatably connected to a corresponding one of the recessed portions 111. An outer peripheral surface of the transforming member 120 serves as the wheel frame 110.

In other words, when the transformable wheel 100 of the present disclosure drives on an even ground, the outer surfaces of the transforming members 120 coincide with the outer circumference of the wheel frame 110, and, thus, the transformable wheel 100 is allowed to have a circular wheel shape. Thus, the transformable wheel 100 has an improved driving efficiency.

The rotating member 130 includes a plurality of transformation locking members 131 which are radially extended from the central axis of the wheel frame 110 and located to correspond to the transforming members 120, respectively. The rotating member 130 may be provided at one side surface of the wheel frame 110.

In particular, each transformation locking member 131 is in contact with an inner peripheral surface of the transforming member 120 and serves to lock the transforming member 120 to hinder the transforming member 120 from rotating in an inward direction when an external force is applied to the transforming member 120.

The driving member 140 is configured to rotate the rotating member 130 by a preset angle with respect to the central axis of the wheel frame 110. It is contemplated that the driving member 140 is capable of rotating the rotating member 130 manually or automatically.

With the above-described configuration, when the transformable wheel 100 according to the present disclosure travels on an even ground, the transforming members 120 are fixed by the transformation locking members 131, and, thus, the outer circumference of the transformable wheel 100 can be maintained in a round shape. Further, upon encountering an obstacle, the transformation locking members 131 are rotated by the driving member 140, and, thus, the locking of the transforming members 120 is released. Accordingly, the transformable wheel 100 can be transformed to a wheel shape having grooves.

Below, the transformable wheel 100 according to the first example embodiment will be explained in more detail.

The transformable wheel 100, in general, includes a wheel frame 110, transforming members 120, a rotating member 130 and a driving member 140.

The wheel frame 110 has, as stated above, a plurality of contact portions 113 which are located at an outer circumference thereof; and recessed portions 111 which are provided between the contact portions 113. Each of the contact portions 113 is formed at a regular angle with respect to the central axis, and each of the recessed portions 111 is depressed from the outer circumference of the wheel frame 110 in the inward direction.

Each transforming member 120 is rotatably connected to a corresponding one of the recessed portions 111. Further, the transforming member 120 includes a ground contact portion 121, a hinge 122 and a ground contact supporting portion 123.

When the transformable wheel 100 travels on an even ground, the ground contact portion 121 is capable of serving as the wheel frame 110. The ground contact portion 121 has the same curvature as that of the contact portion 113. Accordingly, the outer circumference of the transformable wheel 100 can have a circular shape.

The hinge 122 is provided at one side of the ground contact portion 121 and is hingely coupled to one end portion of the contact portion 113. That is, the transforming member 120 can be rotated about the hinge 122.

The ground contact supporting portion 123 protrudes from an inner surface of the ground contact portion 121 in a direction toward the central axis of the wheel frame 110.

Further, one side of the ground contact supporting portion 123 is fixed to the inner surface of the ground contact portion 121, and the other side of the ground contact supporting portion 123 is elastically supported by a non-illustrated elastic structure.

Accordingly, referring to FIG. 2, if a transformation locking member 131 is separated from the ground contact portion 121, the transforming member 120 can be rotated about the hinge 122 in the inward direction of the wheel frame 110.

The rotating member 130 is located at the one side surface of the wheel frame 110. Further, the rotating member 130 includes a plurality of transformation locking members 131 which extend radially from the central axis of the wheel frame 110 to correspond to the transforming members 120, respectively.

Further, each of the transformation locking members 131 is configured to either "lock" a corresponding one of the transforming members 120 to hinder the transforming member 120 from rotating in the inward direction of the wheel frame 110 or to "release the locking" of the transforming member 120 so that the transforming member 120 can rotate in the inward direction of the wheel frame 110.

Here, the term "lock," cited above, implies creating a locked state where the transformation locking member 131 is located or positioned at the inner surface of the transforming member 120, and the term "release the locking" implies creating an unlocked state where the transformation locking member 131 is deviated or moved from the inner surface of the transforming member 120.

In other words, when the transformable wheel 100, according to the first example embodiment, travels on an even ground, the transforming members 120 are turned into a locked state, and, thus, the transformable wheel 100 becomes a round wheel having a circular outer circumference. When the transformable wheel 100 encounters a barrier, on the other end, the transforming members 120 are turned into an unlocked state, so that the transformable wheel 100 transforms to a wheel having a plurality of grooves at the outer circumference thereof.

The driving member 140 is configured to rotate the rotating member 130 by a preset angle with respect to the central axis of the wheel frame 110. By way of a non-limiting example, the driving member 140 may be a stepping motor 141.

The stepping motor 141 may be a motor which is moved by a preset angle corresponding to an input pulse number. Since the stepping motor is well-known to a person having an ordinary skill in the art, a detailed description thereof will be omitted.

Now, referring to FIG. 3 to FIG. 5, a transformable wheel 102 according to a second example embodiment will be discussed.

The transformable wheel 102 according to the second example embodiment is characterized in that an engagement groove 112 is formed in a wheel frame 110, and a rotating member 130 is rotated by a movement locking member 142 which is moved along the engagement groove 112.

As shown in FIG. 4, the engagement groove 112 includes a movement slit 112a formed to have a preset angle with respect to a central axis of the wheel; a first insertion slit 112b formed at one end of the movement slit 112a; and a second insertion slit 112c formed at the other end of the movement slit 112a.

Further, a driving member 140 includes the movement locking member 142 configured to be fixed (fitted) or disposed in the first insertion slit 112b or the second insertion slit 112c; and an elastic body 143 configured to elastically support the movement locking member 142.

By way of example, when the movement locking member 142 is located within the first insertion slit 112b, by pressing the movement locking member 142 in a direction toward the central axis of the wheel frame 110, the movement locking member 142 is separated from or moved out of the first insertion slit 112b. Then, the movement locking member 142 is moved along the movement slit 112a and fitted or positioned into the second insertion slit 112c. At this time, the rotating member 130 is rotated in a direction from the first insertion slit 112b toward the second insertion slit 112c, and the transformation locking members 131 are separated from the inner surfaces of the ground contact portions 121, so that the recessed portions 111 formed along the outer circumference of the wheel frame 110 are exposed to the outside.

Further, when the movement locking member 142 is located within the second insertion slit 112c, by pressing the movement locking member 142 in the direction toward the central axis of the wheel frame 110, the movement locking member 142 is deviated or withdrawn from the second insertion slit 112c. Then, the movement locking member 142 is moved along the movement slit 112a and set or positioned into the first insertion slit 112b. At this time, the rotating member 130 is rotated in a direction from the second insertion slit 112c toward the first insertion slit 112b, and the transformation locking members 131 are moved to engage the inner surfaces of the ground contact portions 121. Accordingly, the transforming members 120 can be fixed in place so as not to be rotated in the inward direction.

Now, referring to FIG. 6 to FIG. 8B, a transformable wheel 103 according to a third example embodiment will be described.

The transformable wheel 103 according to the third example embodiment is characterized in that a rotating member 130 is rotated as at least one pressing member 144 located along an outer peripheral surface of a contact portion 113 is pressurized.

As depicted in FIG. 6, a driving member 140 includes a plurality of pressing members 144 which are arranged along the outer peripheral surface of the contact portion 113 so as to be movable in the inward direction.

The rotating member 130 includes a saw tooth portion 132 and a plurality of transformation locking members 131 arranged radially from the central axis of the wheel frame 110 to correspond to transforming members 120, respectively. Further, the rotating member 130 may be provided at one side surface of the wheel frame 110.

In particular, a multiple number of pressing members 144 may be provided along the outer circumference of the contact portion 113 such that one side of each pressing member 144 is protruded to the outer peripheral surface of the contact portion 113 and the other side thereof is in contact with the saw tooth portion 132 of the rotating member 130.

An elastic member 145 is configured to support the rotating member 130 elastically lest the rotating member 130 should be rotated by a force which is applied to the rotating member 130 from the pressing members 144. Further, if a force applied to the saw tooth portion 132 by the pressing members 144 is larger than the elastic force of the elastic member 145, the rotating member 130 can be rotated by a preset angle.

By way of example, as shown in FIG. 7, the elastic member 145 is capable of supporting the rotating member 130 elastically in a clockwise direction. Further, as the pressing members 144 pressurize the saw tooth portion 132 of the rotating member 130, the rotating member 130 can be rotated in a counterclockwise direction. At this time, as the rotating member 130 is rotate in the counterclockwise direction, the transformation locking members 131 are deviated from the inner surfaces of the ground contact portions 121, and the transforming members 120 are rotated in the inward direction, so that a plurality of recessed portions 111 can be exposed to the outside along the outer circumference of the wheel frame 110.

Now, an operation mechanism of the transformable wheel 103 according to the third example embodiment will be described with reference to FIG. 8A to FIG. 8B.

Referring to FIG. 8A, when the transformable wheel 103 of the third example embodiment travels on an even ground, the elastic force of the elastic member 145 is larger than the force applied to the saw tooth portion 132 by the pressing members 144. Thus, the transformation locking members 131 are located at the inner surfaces of the ground contact portions 121, so that the transforming members 120 can be set in a locked state.

Further, referring to FIG. 8B, when the transformable wheel 103 of the third example embodiment comes into contact with an obstacle, the force applied to the saw tooth portion 132 is larger than the elastic force of the elastic member 145. Accordingly, the transformation locking members 131 are deviated or moved from the inner surfaces of the ground contact portions 121, so that the transforming members 120 are turned into an unlocked state.

When the transformable wheel 103 comes into contact with an obstacle, the force applied to the saw tooth portion 132 by the pressing members 144 is increased due to a normal force and a pressure by the obstacle. As a result, the rotating member 130 is rotated. At this time, the transformation locking members 131 are deviated or moved from the inner surface of the ground contact portions 121, and the transforming members 120 are rotated in the inward direction, thus allowing the recessed portions 111 to be exposed to the outside.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

We claim:

1. A transformable wheel, comprising:
   a wheel frame including a plurality of contact portions and a plurality of recessed portions, the contact portions being provided at an outer circumference of the wheel frame and each being formed at a preset angle with respect to a central axis of the wheel frame, and the recessed portions being provided between the plurality of contact portions and each being depressed from the outer circumference of the wheel frame in an inward direction thereof;
   a plurality of transforming members, one side of each transforming member being rotatably coupled to a corresponding one of the recessed portions and an outer surface of each transforming member forming a portion of the wheel frame;
   a rotating member provided at one side surface of the wheel frame, and including a plurality of transformation locking members arranged radially from the central axis of the wheel frame to correspond to the plurality of transforming members, respectively; and
   a driving member configured to rotate the rotating member by a preset angle about the central axis of the wheel frame,
   wherein the plurality of transformation locking members are moved from the inner surfaces of the plurality of transforming members as the rotating member is rotated by the driving member, and
   a plurality of grooves is formed along the outer circumference of the wheel frame as the plurality of transforming members are rotated in the inward direction of the wheel frame.

2. The transformable wheel of claim 1,
   wherein each transforming member includes:
   a ground contact portion having the same curvature as that of the contact portion;
   a hinge provided at one end of the ground contact portion and coupled to one end portion of a corresponding one of the contact portions; and
   a ground contact supporting portion protruded from an inner surface of the ground contact portion in a direction toward the central axis of the wheel frame.

3. The transformable wheel of claim 1,
   wherein the driving member includes a stepping motor configured to rotate the rotating member about the central axis of the wheel frame.

4. The transformable wheel of claim 1,
   wherein the wheel frame is provided with an engagement groove which includes a movement slit formed at a preset angle with respect to the central axis, a first insertion slit formed at one end of the movement slit and a second insertion slit formed at another end of the movement slit, and the driving member includes a movement locking member dimensioned to be selectively received into the first insertion slit or the second insertion slit, and an elastic body configured to support the movement locking member elastically.

5. A transformable wheel, comprising:

a wheel frame including a plurality of contact portions and a plurality of recessed portions, the contact portions being provided at an outer circumference of the wheel frame and each being formed at a preset angle with respect to a central axis of the wheel frame, and the recessed portions being provided between the plurality of contact portions and each being depressed from the outer circumference of the wheel frame in an inward direction thereof;

a plurality of transforming members, one side of each transforming member being rotatably coupled to a corresponding one of the recessed portions and an outer surface of each transforming member forming a portion of the wheel frame;

a rotating member provided at one side surface of the wheel frame, and including a saw tooth portion extended along an outer circumference of the rotating member and also including a plurality of transformation locking members arranged radially from the central axis of the wheel frame to correspond to the plurality of transforming members, respectively; and a driving member including a plurality of pressing members provided along outer peripheral surfaces of the contact portions to be movable in the inward direction, wherein the plurality of transformation locking members are moved from the inner surfaces of the plurality of transforming members as the rotating member is rotated by the driving member, and a plurality of grooves is formed along the outer circumference of the wheel frame as the plurality of transforming members are rotated in the inward direction of the wheel frame.

6. The transformable wheel of claim 5, wherein each transforming member includes:

a ground contact portion having the same curvature as that of the contact portion;

a hinge provided at one side of the ground contact portion and coupled to one end portion of a corresponding one of the contact portions; and a ground contact supporting portion protruded from an inner surface of the ground contact portion in a direction toward the central axis of the wheel frame.

7. The transformable wheel of claim 5, wherein when the transformable wheel comes into contact with an obstacle, at least one of the pressing members is moved in a direction toward the central axis of the wheel frame, and the rotating member is rotated by a preset angle as the moved pressing member presses the saw tooth member.

8. The transformable wheel of claim 5, wherein the driving member includes at least one elastic member configured to support the rotating member elastically in a clockwise direction or in a counterclockwise direction.

9. The transformable wheel of claim 8, wherein an elastic force of the elastic member is larger than a force applied to the rotating member from the pressing member when the transformable wheel travels on an even surface, and the elastic force of the elastic member is smaller than the force applied to the rotating member from the pressing member when the transformable wheel comes into contact with an obstacle.

* * * * *